US 7,480,509 B2

(12) United States Patent
Kang et al.

(10) Patent No.: US 7,480,509 B2
(45) Date of Patent: Jan. 20, 2009

(54) HANDOVER SYSTEM AND METHOD FOR MINIMIZING SERVICE DELAY DUE TO PINGPONG EFFECT IN A BROADBAND WIRELESS ACCESS COMMUNICATION SYSTEM

(75) Inventors: Hyun-Jeong Kang, Seoul (KR);
Chang-Hoi Koo, Seongnam-si (KR);
Jung-Je Son, Seongnam-si (KR);
Hyoung-Kyu Lim, Seoul (KR);
Yeong-Moon Son, Anyang-si (KR);
So-Hyun Kim, Suwon-si (KR);
Sung-Jin Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 506 days.

(21) Appl. No.: 11/074,203

(22) Filed: Mar. 7, 2005

(65) Prior Publication Data
US 2005/0197126 A1   Sep. 8, 2005

(30) Foreign Application Priority Data
Mar. 5, 2004   (KR) .................... 10-2004-0015213

(51) Int. Cl.
*H04Q 7/20* (2006.01)
(52) U.S. Cl. .................... 455/442; 455/436; 455/437; 455/453; 370/331
(58) Field of Classification Search ......... 455/436–444, 455/453; 370/331–334
See application file for complete search history.

(56) References Cited

U.S. PATENT DOCUMENTS

| | | | | |
|---|---|---|---|---|
| 5,101,501 | A * | 3/1992 | Gilhousen et al. | 455/442 |
| 5,267,261 | A * | 11/1993 | Blakeney et al. | 370/332 |
| 5,278,892 | A * | 1/1994 | Bolliger et al. | 455/442 |
| 5,603,081 | A * | 2/1997 | Raith et al. | 455/435.3 |
| 5,930,710 | A * | 7/1999 | Sawyer et al. | 455/436 |
| 5,953,665 | A * | 9/1999 | Mattila | 455/434 |
| 6,018,662 | A * | 1/2000 | Periyalwar et al. | 455/442 |
| 6,038,450 | A * | 3/2000 | Brink et al. | 455/442 |
| 6,081,713 | A * | 6/2000 | Desgagne | 455/436 |
| 6,097,954 | A * | 8/2000 | Kumar et al. | 455/442 |
| 6,295,452 | B1 * | 9/2001 | Choi | 455/436 |
| 6,788,959 | B2 * | 9/2004 | Jokinen et al. | 455/552.1 |
| 6,901,061 | B1 * | 5/2005 | Joo et al. | 370/335 |

(Continued)

FOREIGN PATENT DOCUMENTS

JP   2001-128209   5/2001

(Continued)

*Primary Examiner*—Sharad Rampuria
(74) *Attorney, Agent, or Firm*—The Farrell Law Firm, PC

(57) ABSTRACT

In a BWA communication system, an MSS changes its connection from the serving BS to the target BS, and sends the target BS a report indicating that the MSS will change its connection upon detecting occurrence of a pingpong effect in a process of performing a network re-entry operation with the target BS. The target BS sends the serving BS a notification indicating that the MSS will change its connection. Upon receiving from the MSS a report indicating that it will change its connection to the serving BS, the serving BS allocates a contention-free-based ranging resource to the MSS so that the MSS connects a communication service with the serving BS using the contention-free-based ranging resource, minimizing a service delay.

24 Claims, 7 Drawing Sheets

U.S. PATENT DOCUMENTS

| | | | |
|---|---|---|---|
| 6,907,243 B1 * | 6/2005 | Patel | 455/442 |
| 7,016,331 B1 * | 3/2006 | Joo et al. | 370/334 |
| 7,154,870 B2 * | 12/2006 | Joo et al. | 370/334 |
| 7,336,953 B2 * | 2/2008 | Kim et al. | 455/438 |
| 2001/0046863 A1 * | 11/2001 | Rinne et al. | 455/442 |
| 2002/0191627 A1 * | 12/2002 | Subbiah et al. | 370/428 |

FOREIGN PATENT DOCUMENTS

| | | |
|---|---|---|
| KR | 1019990056030 | 7/1999 |
| KR | 1020010017860 | 3/2001 |

* cited by examiner

HANDOVER SYSTEM AND METHOD FOR MINIMIZING SERVICE DELAY DUE TO PINGPONG EFFECT IN A BROADBAND WIRELESS ACCESS COMMUNICATION SYSTEM

PRIORITY

This application claims priority under 35 U.S.C. § 119 to an application entitled "Handover System and Method for Minimizing Service Delay due to Pingpong Effect in a Broadband Wireless Access Communication System" filed in the Korean Intellectual Property Office on Mar. 5, 2004 and assigned Serial No. 2004-15213, the contents of which are incorporated herein by reference.

BACKGROUND OF THE INVENTION

1. Field of the Invention

The present invention relates generally to a Broadband Wireless Access (BWA) mobile communication system, and in particular, to a handover system and method for minimizing a service delay due to a pingpong effect.

2. Description of the Related Art

Research into a 4$^{th}$ generation (4G) communication system, which is the next generation communication system, is being conducted to provide users with high-speed services having various Qualities-of-Service (QoSs). More particularly, in the current 4G communication system, active research is being performed on technology supporting high-speed services for guaranteeing mobility and QoS in a BWA communication system such as a wireless Local Area Network (LAN) system and a wireless Metropolitan Area Network (MAN) system, and the conventional communication systems include an Institute of Electrical and Electronics Engineers (IEEE) 802.16a communication system and an IEEE 802.16e communication system.

The IEEE 802.16a and IEEE 802.16e communication systems are communication systems using an Orthogonal Frequency Division Multiplexing (OFDM) scheme and/or an Orthogonal Frequency Division Multiple Access (OFDMA) scheme in order to support a broadband transmission network to a physical channel of the wireless MAN system. The IEEE 802.16a communication system is a system that considers only a state in which a subscriber station (SS) is located in a fixed position, i.e., mobility of an SS is never taken into consideration, and a unicell structure. However, the IEEE 802.16e communication system is a system that considers mobility of an SS in the IEEE 802.16a communication system, and in the IEEE 802.16e communication system, the SS is called a "mobile subscriber station (MSS)."

FIG. 1 is a diagram schematically illustrating a conventional IEEE 802.16e communication system. Referring to FIG. 1, the IEEE 802.16e communication system has a multicell structure, i.e., has a cell 100 and a cell 150, and includes a base station (BS) 110 for managing the cell 100, a BS 140 for managing the cell 150, and a plurality of MSSs 111, 113, 130, 151, and 153. Signal exchange between the BSs 110 and 140 and the MSSs 111, 113, 130, 151, and 153 is achieved using the OFDM/OFDMA scheme. However, among the MSSs 111, 113, 130, 151, and 153, the MSS 130 is located in a boundary region of the cell 150, i.e., a handover region. If the MSS 130 moves in the direction of the cell 150 managed by the BS 140 while exchanging signals with the BS 110, its serving BS is changed from the BS 110 to the BS 140.

FIG. 2 is a signaling diagram illustrating a handover process initiated by an MSS in a conventional IEEE 802.16e communication system. Referring to FIG. 2, a serving BS 210 transmits a Mobile Neighbor Advertisement (MOB_NBR_ADV) message to an MSS 200 in Step 211. A format of the MOB_NBR_ADV message is illustrated in Table 1.

TABLE 1

| Syntax | Size | Notes |
|---|---|---|
| MOB_NBR_ADV_Message_Format( ) { | | |
| Management Message Type = 48 | 8 bits | |
| Operator ID | 24 bits | Unique ID assigned to the operator |
| Configuration Change Count | 8 bits | |
| N_NEIGHBORS | 8 bits | |
| For (j=0; j<N_NEIGHBORS; j++) { | | |
| Neighbor BS-ID | 48 bits | |
| Physical Frequency | 32 bits | |
| RLV Encoded Neighbor information | Variable | TLV specific |
| } | | |
| } | | |

As illustrated in Table 1, the MOB_NBR_ADV message includes a plurality of information elements (IEs), i.e., a Management Message Type IE indicating a type of a transmission message, an Operator ID IE indicating a network identifier (ID), a Configuration Change Count IE indicating the number of changes in configuration, an N_NEIGHBORS IE indicating the number of neighbor BSs, a Neighbor BS-ID IE indicating IDs of the neighbor BSs, a Physical Frequency IE indicating a frequency of a physical channel for the neighbor BS, and a TLV (Type, Length, Value) Encoded Neighbor Information IE indicating other information related to the neighbor BS.

The MSS 200 can acquire information on neighbor BSs by receiving the MOB_NBR_ADV message. If the MSS 200 desires to scan carrier-to-interference and noise ratios (CINRs) of pilot signals transmitted from neighbor BSs and the serving BS 210, it transmits a Mobile Scanning Interval Allocation Request (MOB_SCN_REQ) message to the serving BS 210 in Step 213. A format of the MOB_SCN_REQ message is illustrated in Table 2.

TABLE 2

| Syntax | Size | Notes |
|---|---|---|
| MOB_SCN_REQ_Message_Format( ) { | | |
| Management Message Type = ? | 8 bits | |
| Scan Duration | 12 bits | Units are frames |
| Start Frame | 4 bits | |
| } | | |

As illustrated in Table 2, the MOB_SCN_REQ message includes a plurality of IEs, i.e., a Management Message Type IE indicating a type of a transmission message, a Scan Duration IE indicating a scanning duration for which the MSS 200 desires to scan CINRs of pilot signals received from the neighbor BSs, and a Start Frame IE indicating a frame at which the MSS 200 will start a scanning operation. The Scan Duration is created on a per-frame basis. In Table 2, the Management Message Type indicating a type of a channel over which the MOB_SCN_REQ message will be transmitted has not been defined yet (Management Message Type=Undefined). Because a time at which the MSS 200 makes a scan request is not directly related to a CINR scanning operation for the pilot signals, a detailed description thereof will not be given herein.

Upon receiving the MOB_SCN_REQ message, the serving BS 210 includes information based on which the MSS 200 will perform scanning in a Mobile Scanning Interval Allocation Response (MOB_SCN_RSP) message with Scan Duration≠0, and transmits the MOB_SCN_RSP message to the MSS 200 in Step 215. A format of the MOB_SCN_RSP message is illustrated in Table 3.

TABLE 3

| Syntax | Size | Notes |
|---|---|---|
| MOB_SCN_RSP_Message_Format( ) { | | |
|   Management Message Type = ? | 8 bits | |
|   For (i=0; i<num_CIDs; i++) { | | num_CIDs can be determined from the length of the message (found in the generic MAC header) |
|     CID | 16 bits | basic CID of the MSS |
|     Duration | 12 bits | in frames |
|     Estimated time for handover | 8 bits | |
|     Start Frame | 4 bits | |
|   } | | |
| } | | |

As illustrated in Table 3, the MOB_SCN_RSP message includes a plurality of IEs, i.e., a Management Message Type IE indicating a type of a transmission message, a Connection ID (CID) IE indicating a CID of the MSS 200 that transmitted the MOB_SCN_REQ message, a Scan Duration IE, and a Start Frame IE indicating a time at which a scanning operation will starts. In Table 3, the Management Message Type indicating a type of a channel over which the MOB_SCN_RSP message will be transmitted has not been defined yet (Management Message Type=Undefined). The Scan Duration indicates a scanning duration for which the MSS 200 performs the pilot CINR scanning, and if the Scan Duration is set to '0' (Scan Duration=0), it indicates that the scan request of the MSS 200 is rejected.

Upon receiving the MOB_SCN_RSP message including the scanning information, the MSS 200 performs CINR scanning on the pilot signals received from the serving BS 210 and neighbor BSs acquired through reception of the MOB_N-BR_ADV message according to parameters, i.e., Scan Duration, included in the MOB_SCN_RSP message in Step 217.

After completing CINR scanning on the pilot signals received from the neighbor BSs and the serving BS 210, the MSS 200 determines if it should change its current serving BS to a new serving BS being different from the serving BS 210 in Step 219. When the MSS 200 determines to changes its current BS, the MSS 200 transmits a Mobile Subscriber Station Handover Request (MOB_MSSHO_REQ) message to the serving BS 210 in Step 221. Herein, a new BS other than the serving BS to which the MSS 200 currently belongs, i.e., a possible new serving BS to which the MSS 200 will be handed over, will be referred to as a "target BS." A format of the MOB_MSSHO_REQ message is illustrated in Table 4.

TABLE 4

| Syntax | Size | Notes |
|---|---|---|
| MOB_MSSHO_REQ_Message_Format( ) { | | |
|   Management Message Type = 52 | 8 bits | |
|   For (j=0; j<N_Recommended; j++) {} | | N_Recommended can be derived from the known length of the message |
|     Neighbor BS-ID | 48 bits | |
|     BS S/(N+I) | 8 bits | |
|     Service level prediction | 8 bits | |
|     Estimated HO Time | 8 bits | |
|   } | | |
| } | | |

As illustrated in Table 4, the MOB_MSSHO_REQ message includes a plurality of IEs, i.e., a Management Message Type IE indicating a type of a transmission message and the scanning results acquired by the MSS 200. In Table 4, N_Recommended indicates the number of neighbor BSs that transmitted pilot signals of which CINRs are higher than or equal to a predetermined CINR, as a result of CINR scanning on the pilot signals from the neighbor BSs by the MSS 200. That is, the N_Recommended indicates the number of neighbor BSs handover-recommended by the MSS 200. The MOB_MSSHO_REQ message includes IDs of neighbor BSs indicated by the N_Recommended, CINRs of pilot signals from the neighbor BSs, a service level predicted to be provided to the MSS 200 by the neighbor BSs, and an estimated handover time (Estimated HO Time) at which the MSS 200 will select one of the neighbor BSs as a target BS and start handover to the target BS.

Upon receiving the MOB_MSSHO_REQ message transmitted by the MSS 200, the serving BS 210 detects a list of candidate target BSs to which the MSS 200 can be handed over, from N_Recommended information in the received MOB_MSSHO_REQ message in Step 223. Herein, the list of candidate target BSs to which the MSS 200 can be handed over will be referred to as a "candidate target BS list," and it will be assumed in FIG. 2 that the candidate target BS list has a first target BS 220 and a second target BS 230. The candidate target BS list can also include a plurality of target BSs in addition to the two target BSs.

The serving BS 210 transmits HO_PRE_NOTIFICATION messages to the target BSs included in the candidate target BS list, i.e., the first target BS 220 and the second target BS 230 in Steps 225 and 227. A format of the HO_PRE_NOTIFICATION message is illustrated in Table 5.

TABLE 5

| Field | Size | Notes |
|---|---|---|
| Global Header | 152-bit | |
| For (j=0; j<Num Records; j++) { | | |
|   MSS unique identifier | 48-bit | 48-bit unique identifier used by MSS (as provided by the MSS or by the I-am-host-of message) |
|   Estimated Time to HO | 16-bit | In milliseconds, relative to the time stamp, value 0 of this |

TABLE 5-continued

| Field | Size | Notes |
|---|---|---|
| | | parameter indicates that no actual HO is pending |
| Required BW | 8-bit | Bandwidth which is required by MSS (to guarantee minimum packet data transmission) |
| Required QoS | 8-bit | Name of Service Class representing AuthorizedQoSParam-Set |
| } | | |
| Security field | TBD | A means to authenticate this message |
| CRC field | 32-bit | IEEE CRC-32 |

As illustrated in Table 5, the HO_PRE_NOTIFICATION message includes a plurality of IEs, i.e., Global Header which is commonly included in messages exchanged between BSs in a backbone network, MSS ID of the MSS 200 that desires to be handed over to the first target BS 220 or the second target BS 230, estimated handover time (Estimated Time to HO) indicating an estimated time at the MSS 200 will start handover, Required BW indicating information on a bandwidth for which the MSS 200 requests a target BS which will become a new serving BS, and Required QoS indicating information on a service level desired by the MSS 200. The bandwidth (BW) and the service level (QoS) requested by the MSS 200 are equal to the predicted service level information written in the MOB_MSSHO_REQ message described with reference to Table 4.

A format of the general Global Header commonly included in messages exchanged between BSs in a backbone network, like the HO_PRE_NOTIFICATION message, is illustrated in Table 6.

TABLE 6

| Field | Size | Notes |
|---|---|---|
| Message Type = ? | 8-bit | |
| Sender BS-ID | 48-bit | Base station unique identifier (Same number as that broadcasted on the DL-MAP message) |
| Target BS-ID | 48-bit | Base station unique identifier (Same number as that broadcasted on the DL-MAP message) |
| Time Stamp | 32-bit | Number of milliseconds since midnight GMT (set to 0xffffffff to ignore) |
| Num Records | 16-bit | Number of MSS identity records |

As illustrated in Table 6, the Global Header includes a plurality of IEs, i.e., Message Type indicating a type of a transmission message, Sender BS-ID indicating a transmission BS that transmits the transmission message, Target BS-ID indicating a reception BS that receives the transmission message, and Num Records indicating the number of MSSs corresponding to records included in the transmission message.

Upon receiving the HO_PRE_NOTIFICATION messages from the serving BS 210, the first target BS 220 and the second target BS 230 transmit HO_PRE_NOTIFICATION_RESPONSE messages to the serving BS 210 in response to the HO_PRE_NOTIFICATION messages in Steps 229 and 231. A format of the HO_PRE_NOTIFICATION_RESPONSE message is illustrated in Table 7.

TABLE 7

| Field | Size | Notes |
|---|---|---|
| Global Header | 152-bit | |
| For (j=0; j<Num Records; j++) { | | |
| MSS unique identifier | 48-bit | 48-bit unique identifier used by MSS (as provided by the MSS or by the I-am-host-of message) |
| BW Estimated | 8-bit | Bandwidth which is provided by BS (to guarantee minimum packet data transmission) TBD how to set this field |
| QoS Estimated | 8-bit | Quality of Service level Unsolicited Grant Service (UGS) Real-time Polling Service (rtPS) Non-real-time Polling Service (nrtPS) Best Effort |
| ACK/NACK | 8-bit | Acknowledgement or Negative Acknowledgement 1 is Acknowledgment which means that the neighbor BS accepts the HO-pre-notification message from the Serving BS 0 is Negative Acknowledgement which means that the neighbor BS may not accept the HO-pre-notification message from the Serving BS |
| } | | |
| Security Field | TBD | A means to authenticate this message |
| CRC field | 32-bit | IEEE CRC-32 |

As illustrated in Table 7, the HO_PRE_NOTIFICATION_RESPONSE message includes a plurality of IEs, i.e., a Global Header which is commonly included in messages exchanged between BSs in a backbone network as described with reference to Table 6, an MSS ID of the MSS 200 that desires to be handed over to the target BSs, an ACK/NACK indicating whether the target BSs can perform handover in response to an handover request from the MSS 200, and bandwidth and service level information for indicating a bandwidth and a service level supportable by the target BSs to which the MSS 200 is handed over.

Upon receiving the HO_PRE_NOTIFICATION_RESPONSE messages from the first target BS 220 and the second target BS 230, the serving BS 210 analyzes the HO_PRE_NOTIFICATION_RESPONSE messages received from the first target BS 220 and the second target BS 230, and selects a target BS that can optimally support the bandwidth and service level requested by the MSS 200 after handover, as a final target BS to which the MSS 200 will be handed over. For example, if it is assumed that a service level supportable by the first target BS 220 is lower than the service level requested by the MSS 200 and a service level supportable by the second target BS 230 is equal to the service level requested by the MSS 200, the serving BS 210 selects the second target BS 230 as a final target BS to which the MSS 200 will be handed over. Therefore, the serving BS 210 transmits a HO_CONFIRM message to the second target BS 230 in response to the HO_PRE_NOTIFICATION_RESPONSE message in Step 233. A format of the HO_CONFIRM message is illustrated in Table 8.

TABLE 8

| Field | Size | Notes |
|---|---|---|
| Global Header | 152-bit | |
| For (j=0; j<Num Records; j++) { | | |
|   MSS unique identifier | 48-bit | 48-bit universal MAC address of the MSS (as provided to the BS on the RNG-REQ message) |
|   BW Estimated | 8-bit | Bandwidth which is provided by BS (to guarantee minimum packet data transmission) TBD how to set this field |
|   QoS Estimated | 8-bit | Quality of Service Level Unsolicited Grant Service (UGS) Real-time Polling Service (rtPS) Non-real-time Polling Service (nrtPS) Best Effort Service (BE) |
| } | | |
| Security field | TBD | A means to authenticate this message |
| CRC field | 32-bit | IEEE CRC-32 |

As illustrated in Table 8, the HO_CONFIRM message includes a plurality of IEs, i.e., a Global Header which is commonly included in messages exchanged between BSs in a backbone network as described with reference to Table 6, an MSS ID of the MSS 200 that desires to be handed over to the selected target BS, and bandwidth and service level information for indicating a bandwidth and a service level supportable by the selected target BS to which the MSS 200 is handed over.

In addition, the serving BS 210 transmits a Mobile BS Handover Response (MOB_BSHO_RSP) message to the MSS 200 in response to the MOB_MSSHO_REQ message in Step 235. Herein, the MOB_BSHO_RSP message includes information on a target BS to which the MSS 200 will be handed over. A format of the MOB_BSHO_RSP message is illustrated in Table 9.

TABLE 9

| Syntax | Size | Notes |
|---|---|---|
| MOB_BSHO_RSP_Message_format( ) { | | |
|   Management Message Type = 53 | 8 bits | |
|   Estimated HO time | 8 bits | |
|   For (j=0; j<N_Recommended; j++) { | | Neighbor base stations shall be presented in an order such that the first presented is the one most recommended and the last presented is the least recommended. N_Recommended can be derived from the known length of the message. |
|     Neighbor BS-ID | 48 bits | |
|     service level prediction | 8 bits | |
|   } | | |
| } | | |

As illustrated in Table 9, the MOB_BSHO_RSP message includes a plurality of IEs, i.e., a Management Message Type indicating a type of a transmission message, an Estimated HO time indicating an estimated time at which a handover procedure will start, and information on target BSs selected by the serving BS. In addition, N_Recommended in the MOB_BSHO_RSP message indicates the number of target BSs satisfying the bandwidth and service level requested by the MSS 200, among the target BSs in the candidate target BS list. The MOB_BSHO_RSP message includes IDs for target BSs indicated by the N_Recommended, and a predicted service level supportable to the MSS 200 by the target BSs. Although only the information on one target BS of the second target BS 230 among the target BSs existing in the candidate target BS list is finally included in the MOB_BSHO_RSP message in FIG. 2, if there are several target BSs satisfying the bandwidth and service level requested by the MSS 200 among the target BSs existing in the candidate target BS list, information on the several target BSs is included in the MOB_BSHO_RSP message.

Upon receiving the MOB_BSHO_RSP message, the MSS 200 analyzes N_Recommended information included in the received MOB_BSHO_RSP message, and selects a target BS to which it will be handed over based on the analysis result.

After selecting the target BS, the MSS 200 transmits a Mobile Handover Indication (MOB_HO_IND) message to the serving BS 210 in response to the MOB_BSHO_RSP message in Step 237. A format of the MOB_HO_IND message is illustrated in Table 10.

TABLE 10

| Syntax | Size | Notes |
|---|---|---|
| MOB HO IND Message Format( ) { | | |
|   Management Message Type = 54 | 8 bits | |
|   reserved | 6 bits | Reserved; shall be set to zero |
|   HO_IND_type | 2 bits | 00: Serving BS release 01: HO cancel 10: HO reject 11: reserved |
|   Target_BS_ID | 48 bits | Applicable only when HO_IND-type is set to 00. |
|   HMAC Tuple | 21 bytes | See 11.4.11 |
| } | | |

As illustrated in Table 10, the MOB_HO_IND message includes a plurality of IEs, i.e., a Management Message Type indicating a type of a transmission message, HO_IND_type indicating whether the MSS 200 has determined, canceled or rejected handover to the selected final target BS, ID of the selected final target BS when the MSS 200 determines the handover, and HMAC Tuple used for authentication of the MOB_HO_IND message. The MSS 200 transmits a MOB_HO_RSP message with HO_IND_type=00 when it has determined to perform handover to the final target BS, transmits a MOB_HO_RSP message with HO_IND_type=01 when it has determined to cancel the handover to the final target BS, and transmits a MOB_HO_RSP message with HO_IND_type=10 when it has determined to reject the handover to the final target BS.

Upon receiving the MOB_HO_IND message with HO_IND_type=10, the serving BS 210 updates the candidate target BS list and retransmits a MOB_BSHO_RSP message with the candidate target BS list to the MSS 200.

Upon receiving the MOB_HO_IND message with HO_IND_type=00, the serving BS 210 recognizes that the MSS 200 will perform handover to the target BS included in the MOB_HO_IND message, i.e., the second target BS 230, and releases a connection currently set up to the MSS 200 or retains the connection set up to the MSS 200 for a predetermined time until it receives a report indicating completion of the handover procedure from the target BS finally selected by the MSS 200, i.e., the second target BS 230 in Step 239.

After transmitting the MOB_HO_IND message to the serving BS 210, the MSS 200 performs the remaining handover operation with the second target BS 230.

FIG. 3 is a signaling diagram illustrating a handover process initiated by a BS in a conventional IEEE 802.16e communication system. However, before a description of FIG. 3 is given, it should be noted that the handover initiated by a BS occurs when the BS requires load sharing for dispersing its own load to neighbor BSs due to its excessive load, or when it is necessary to cope with a variation in an uplink state of an MSS.

Referring to FIG. 3, a serving BS 310 transmits a MOB_NBR_ADV message to an MSS 300 in Step 311. The MSS 300 can acquire information on neighbor BSs by receiving the MOB_NBR_ADV message.

In Step 313, if the serving BS 310 detects a handover requirement for the MSS 300 that it is current managing, the serving BS 310 transmits HO_PRE_NOTIFICATION messages to neighbor BSs in Step 315 and 317. Herein, the HO_PRE_NOTIFICATION message includes information on a bandwidth and service level that should be supported by a target BS, which will become a new serving BS of the MSS 300. It will be assumed in FIG. 3 that the neighbor BSs of the serving BS 310 include two BSs of a first target BS 320 and a second target BS 330.

Upon receiving the HO_PRE_NOTIFICATION messages, the first target BS 320 and the second target BS 330 transmit HO_PRE_NOTIFICATION_RESPONSE messages to the serving BS 310 in response to the HO_PRE_NOTIFICATION messages, respectively, in Steps 319 and 321. The HO_PRE_NOTIFICATION_RESPONSE message includes ACK/NACK indicating if the target BSs can perform handover requested by the serving BS 310, and information on a bandwidth and service level supportable to the MSS 300, as described with reference to Table 7.

Upon receiving the HO_PRE_NOTIFICATION_RESPONSE messages from the first target BS 320 and the second target BS 330, the serving BS 310 selects target BSs that can support the bandwidth and service level requested by the MSS 300. For example, if it is assumed that a service level supportable by the first target BS 320 is lower than the service level requested by the MSS 300 and a service level supportable by the second target BS 330 is equal to the service level requested by the MSS 300, the serving BS 310 selects the second target BS 330 as a target BS to which the MSS 300 can be handed over.

After selecting the second target BS 330 as a candidate target BS, the serving BS 310 transmits a Mobile BS Handover Request (MOB_BSHO_REQ) message including the updated candidate target BS list to the MSS 300 in Step 323. Herein, the candidate target BS list can include a plurality of target BSs. A format of the MOB_BSHO_REQ message is illustrated in Table 11.

TABLE 11

| Syntax | Size | Notes |
|---|---|---|
| MOB_BHSO_REQ_Message_Format( ) { | | |
|   Management Message Type = 51 | 8 bits | |
|   For (j=0; j<N_Recommended; j++) { | | N_Recommended can be derived from the known length of the message |
|     Neighbor BS-ID | 48 bits | |
|     Service level prediction | 8 bits | |
|   } | | |
| } | | |

As illustrated in Table 11, the MOB_BSHO_REQ message includes a plurality of IEs, i.e., Management Message Type indicating a type of a transmission message and information on the target BSs selected by the serving BS 310.

In Table 11, N_Recommended indicates the number of neighbor BSs selected as candidate target BSs by the serving BS 310, and the MOB_BSHO_REQ message includes IDs for the neighbor BSs indicated by the N_Recommended, and information on a bandwidth and service level supportable to the MSS 300 by the neighbor BSs.

Upon receiving the MOB_BSHO_REQ message, the MSS 300 recognizes that handover has been requested by the serving BS 310, and selects a final target BS to which it will perform handover, based on the N_Recommended information included in the MOB_BSHO_REQ message. Before selecting the final target BS, if the MSS 300 desires to scan CINRs of the pilot signals transmitted from the serving BS 310 and the neighbor BSs, the MSS 300 transmits a MOB_SCN_REQ message to the serving BS 310 in Step 325. Because a time at which the MSS 300 makes a scan request is not directly related to a CINR scanning operation for the pilot signals, a detailed description thereof will not be given herein.

Upon receiving the MOB_SCN_REQ message, the serving BS 310 transmits a MOB_SCN_RSP message including scanning information based on which the MSS 300 will perform scanning, to the MSS 300 in Step 327.

Upon receiving the MOB_SCN_RSP message including the scanning information, the MSS 300 performs CINR scanning on the pilot signals received from neighbor BSs acquired through reception of the MOB_NBR_ADV message, candidate target BSs acquired through reception of the MOB_BSHO_REQ message, and the serving BS 310, according to parameters, i.e., Scan Duration, included in the MOB_SCN_RSP message in Step 329.

After selecting its final candidate target BS, the MSS 300 transmits a Mobile MSS Handover Response (MOB_MSSHO_RSP) to the serving BS 310 in response to the MOB_BSHO_REQ message in Step 331. A format of the MOB_MSSHO_RSP message is illustrated in Table 12.

TABLE 12

| Syntax | Size | Notes |
|---|---|---|
| MOB_MSSHO_RSP_Message_Format( ) { | | |
|   Management Message Type = 54 | 8 bits | |
|   Estimated HO time | 8 bits | |

TABLE 12-continued

| Syntax | Size | Notes |
|---|---|---|
| For (j=0; j<N_Recommended; j++) { | | N_Recommended can be derived from the known length of the message |
|     Neighbor BS-ID | 48 bits | |
|     BS S/(N+1) | 8 bits | |
| } | | |
| } | | |

As illustrated in Table 12, the MOB_MSSHO_RSP includes a plurality of IEs, i.e., Management Message Type indicating a type of a transmission message, an estimated time at which the handover procedure will start, and information on the target BSs selected by the MSS 310.

In Table 12, N_Recommended indicates the number of neighbor BSs selected as candidate target BSs by the MSS 300, and the MOB_MSSHO_RSP message includes IDs for the neighbor BSs indicated by the N_Recommended, and information on a service level supportable to the MSS 300 by the neighbor BSs.

The serving BS 310 transmits a HO_CONFIRM message to the neighbor BS selected as the final target BS by the MSS 300 in response to the HO_PRE_NOTIFICATION_RESPONSE message in Step 333. After selecting the final target BS, the MSS 330 transmits a MOB_HO_IND message with HO_IND_type=00 to the serving BS 310 in Step 335.

Upon receiving the MOB_HO_IND message with HO_IND_type=00, the serving BS 310 re-recognizes that the MSS 300 will perform handover to the final target BS included in the MOB_HO_IND message, and then releases a connection currently set up to the MSS 300 or retains the connection set up to the MSS 300 for a predetermined time until it receives a report indicating completion of the handover procedure from the finally selected target BS, i.e., the second target BS 330 in Step 337.

After transmitting the MOB_HO_IND message to the serving BS 310, the MSS 300 performs the remaining handover operation with the second target BS 330.

FIG. 4 is a signaling diagram illustrating a network re-entry process upon handover of an MSS in a conventional IEEE 802.16e communication system. Referring to FIG. 4, as an MSS 400 changes its connection to a final target BS 450, the MSS 400 acquires downlink synchronization with the final target BS 450 and then receives a downlink_MAP (DL_MAP) message from the final target BS 450 in Step 411. Herein, the DL_MAP message includes parameters related to a downlink of the final target BS 450.

Further, the MSS 400 receives an uplink_MAP (UL_MAP) message from the final target BS 450 in Step 413. The UL_MAP message includes parameters related to an uplink of the final target BS 450, and includes a Fast UL Ranging IE allocated to support fast UL ranging of the MSS 400 whose handover is being performed by the final target BS 450. The final target BS 450 allocates the Fast UL Ranging IE to the MSS 400 to minimize a possible delay caused by handover. Therefore, the MSS 400 can perform initial ranging with the final target BS 450 on a contention-free basis according to the Fast UL Ranging IE. A format of the Fast UL Ranging IE included in the UL_MAP message is illustrated in Table 13.

TABLE 13

| Syntax | Size | Notes |
|---|---|---|
| Fast_UL_range IE { | | |
|   MAC address | 48 bits | MSS MAC address as provided on the RNG_REQ message on initial system entry |
|   UIUC | 4 bits | UIUC ≠ 15. A four-bit code used to define the type of uplink access and the burst type associated with that access. |
|   OFDM Symbol offset | 10 bits | The offset of the OFDM symbol in which the burst starts, the offset value is defined in units of OFDM symbols and is relevant to the Allocation Start Time field given in the UL-MAP message. |
|   Subchannel offset | 6 bits | The lowest index OFDMA subchannel used for carrying the burst, starting from subchannel 0. |
|   No. OFDM symbols | 10 bits | The number of OFDM symbol that are used to carry the UL Burst |
|   No. Subchannels | 6 bits | The number of OFDMA subchannels with subsequent indexes, used to carry the burst. |
|   Reserved | 4 bits | |
| } | | |

In Table 13, Fast_UL_ranging_IE( ) includes a MAC address of an MSS that will be provided with ranging opportunity, an Uplink Interval Usage Code (UIUC) providing information on a field in which a start offset value for the Fast_UL_ranging—IE( ) is recorded, information on an offset of a contention-free-based ranging opportunity interval allocated to the MSS 400, the number of symbols, and the number of subchannels. A MAC address of the MSS 400 has already been reported to the final target BS 450 through messages exchanged between a serving BS and a target BS in a backbone network in the handover process described with reference to FIGS. 2 and 3, like the HO_PRE_NOTIFICATION/HO_PRE_NOTIFICATION_RESPONSE/HO_CONFIRM messages.

Upon receiving the UL_MAP message, the MSS 400 transmits a Ranging Request (RNG_REQ) message to the final target BS 450 according to the Fast UL Ranging IE in Step 415. Upon receiving the RNG_REQ message, the final target BS 450 transmits a Ranging Response (RNG_RSP) message including information for correcting frequency, time and transmission power for the ranging, to the MSS 400 in Step 417.

After completing the initial ranging, the MSS 400 and the final target BS 450 perform a re-authorization operation on the MSS 400 (MSS RE-AUTHORIZATION) in Step 419. In the process of the re-authorization operation, if there is no change in security context exchanged between an old (or former) serving BS of the MSS 400 and the final target BS 450, the final target BS 450 uses the security context intact. A format of an MSS Information Response (MSS_INFO_RSP) message, which is a backbone network message for providing security context information of the MSS 400, is illustrated in Table 14.

TABLE 14

| Fields | Size | Notes |
|---|---|---|
| Global Header | 152-bit | |
| For (j=0; j<Num Records; j++) { | | |
|   MSS unique identifier | 48-bit | 48-bit unique identifier used by MSS (as provided by the MSS or by |

TABLE 14-continued

| Fields | Size | Notes |
|---|---|---|
| | | the I-am-host-of message) |
| N_NSIE | | Number of Network Service Information Elements |
| For (k=0; k<N_NSIE; k++) { | | |
| Field Size | 16-bit | Size of TLV encoded information field below |
| TLV encoded information | Variable | TLV information as allowed on a DSA-REQ MAC message |
| } | | |
| N_SAIE | | Number of Security Associated Information Elements |
| For (k=0; k<N_SAIE; k++) { | | |
| Field Size | 16-bit | Size of TLV encoded information field below |
| TLV encoded information | Variable | TLV information as allowed a PKM-xxx MAC message |
| } | | |
| N_MSS_CAP | | Number of MSS Capabilities |
| For (k=0; k<N_MSS_CAP; k++) { | | |
| Field Size | 16-bit | Size of TLV encoded information field below |
| TLV encoded information | Variable | TLV information as allowed on a SBC-REQ MAC message |
| } | | |
| TLV encoded information | Variable | TLV information as allowed on a SBC-REQ MAC message |
| } | | |
| Security field | TBD | A means to authenticate this message |
| CRC field | 32-bit | IEEE CRC-32 |

In Table 14, the MSS_INFO_RSP message includes ID information of an MSS registered in a serving BS, security context information such as Security Association Information for each MSS, network service information for each MSS, and capability information of each MSS.

When the re-authentication operation for the final target BS 450 and the MSS 400 is completed, the MSS 400 transmits a Registration Request (REG_REQ) message to the final target BS 450 in Step 421. The REG_REQ message includes registration information of the MSS 400. The final target BS 450 transmits a Registration Response (REG_RSP) message to the MSS in response to the REG_REQ message in Step 423. Herein, the final target BS 450 can recognize the MSS 400 as an MSS that has been handed over thereto, by detecting registration information of the MSS 400 included in the REG_REQ message received from the MSS 400.

Accordingly, the final target BS 450 maps connection information in the old serving BS of the MSS 400 to connection information in the final target BS 450, and transmits to the MSS 400 the REG_RSP message including TLV values based on which a service flow that can be actually provided in the final target BS can be reset. A format of the TLV including mapping information for connection setup in the serving BS and the final target BS 450 is illustrated in Table 15.

TABLE 15

| Name | Type (1 byte) | Length (1 byte) | Value (Variable-length) |
|---|---|---|---|
| New_CID | 2.1 | 2 | New CID after handover to new BS |
| Old_CID | 2.2 | 2 | Old CID before handover from old BS |
| Connection Info | 2.3 | Variable | If any of the service flow parameters change, then those service flow parameters and CS parameter encoding TLVs that have changed will be added. Connection_Info is a compound TLV value that encapsulates the Service Flow Parameters and the CS Parameter that have changed for the service. All the rules and settings that apply to the parameters when used in the DSC-RSP message apply to the contents encapsulated in this TLV. |

In Table 15, the TLV included in the REG_RSP message provides CID information used in the old serving BS before handover of the MSS 400, and CID information to be used in the final target BS 450 after handover of the MSS 400. In addition, when the final target BS 450 provides a service that is different from the service flow provided by the old serving BS before a handover, the TLV includes information on the changed service parameters.

After completing the network re-entry procedure with the final target BS 450, the MSS 400 performs a normal communication service through the final target BS 450 in Step 425.

As described above, in the IEEE 802.16e communication system, when a CINR of a pilot signal transmitted by a serving BS decreases such that an MSS cannot maintain communication with the current serving BS, the MSS is handed over to a neighbor BS different from the serving BS, i.e., a final target BS, according to a request of the MSS or a request of the serving BS. However, in the IEEE 802.16e communication system, when the MSS cannot perform a communication service through the final target BS due to a decrease in CINR of the pilot signal transmitted by the final target BS in a process of performing a network re-entry operation with the final target BS, the MSS may change its connection back to the serving BS.

However, after the MSS changes its connection to the serving BS due to the foregoing pingpong effect in a process of performing a handover operation with the final target BS, the MSS should perform an initial connection setup procedure with the serving BS, i.e., perform a network re-entry operation, in order to resume the communication service through the serving BS. Therefore, when the pingpong effect frequently happens while the MSS is performing handover, the MSS frequently performs the network re-entry operation, increasing service delay. The frequent implementation of the network re-entry operation also increases a signaling load, causing a reduction in the entire system performance.

SUMMARY OF THE INVENTION

It is, therefore, an object of the present invention to provide a handover system and method for minimizing a service delay due to a pingpong effect in a BWA communication system.

It is another object of the present invention to provide a handover system and method for preferentially resuming communication of an MSS upon occurrence of a pingpong effect in a BWA communication system.

In accordance with a first aspect of the present invention, there is provided a handover method for minimizing a service delay due to a pingpong effect in a Broadband Wireless Access (BWA) communication system having a mobile subscriber station (MSS), a serving base station (BS) in communication with the MSS, and a plurality of neighbor BSs being different from the serving BS. The method comprises the steps of upon detecting a need for performing handover from the serving BS to a target BS selected from the neighbor BSs, changing, by the MSS, its connection from the serving BS to the target BS; after changing its connection from the serving BS to the target BS, detecting, by the MSS, occurrence of the pingpong effect while performing a network re-entry operation with the target BS; sending, by the MSS, to the target BS, a report indicating that the MSS will change its connection from the target BS to the serving BS due to the occurrence of the pingpong effect sending, by the target BS, to the serving BS, a notification indicating that the MSS will change its connection from the target BS to the serving BS, based on the report from the MSS; allocating, by the serving BS, a contention-free-based ranging resource to the MSS based on the notification from the target BS; and connecting, by the MSS, to a communication service with the serving BS using the contention-free-based ranging resource.

In accordance with a second aspect of the present invention, there is provided a handover method of a mobile subscriber station (MSS) for minimizing a service delay due to a pingpong effect in a Broadband Wireless Access (BWA) communication system having the MSS, a serving base station (BS) in communication with the MSS, and a plurality of neighbor BSs being different from the serving BS. The method comprises the steps of upon detecting a need for performing handover from the serving BS to a target BS selected from the neighbor BSs, changing its connection from the serving BS to the target BS; after changing its connection from the serving BS to the target BS, detecting an occurrence of the pingpong effect when performing a network re-entry operation with the target BS; sending, to the target BS, a report indicating that the MSS will change its connection from the target BS to the serving BS due to the occurrence of the pingpong effect; after sending, to the target BS, the report indicating that the MSS will change its connection to the serving BS, changing its connection from the target BS to the serving BS; and after changing its connection to the serving BS, connecting a communication service with the serving BS using a contention-free-based ranging resource allocated from the serving BS.

In accordance with a third aspect of the present invention, there is provided a handover method of a target base station (BS) for minimizing a service delay due to a pingpong effect in a Broadband Wireless Access (BWA) communication system having a mobile subscriber station (MSS), a serving BS in communication with the MSS, and a plurality of neighbor BSs being different from the serving BS. The method comprises the steps of upon detecting the MSS's need for performing a handover from the serving BS to the target BS, receiving from the MSS a report indicating that the MSS will change its connection from the target BS to the serving BS due to occurrence of the pingpong effect while performing a network re-entry operation with the MSS that has changed its connection from the serving BS to the target BS; and sending, to the serving BS, a notification indicating that the MSS will change its connection from the target BS to the serving BS, based on the report from the MSS.

In accordance with a fourth aspect of the present invention, there is provided a handover method of a serving base station (BS) for minimizing a serving delay due to a pingpong effect in a Broad band Wireless Access (BWA) communication system having a mobile subscriber station (MSS), the serving BS in communication with the MSS, and a plurality of neighbor BSs being different from the serving BS. The method comprising the steps of upon receiving from the MSS a notification indicating that the MSS will perform handover from the serving BS to a target BS selected from the neighbor BS, deleting connection information for the MSS; receiving from the target BS a notification indicating that the MSS will change its connection to the serving BS due to occurrence of the pingpong effect; upon receiving from the MSS a notification indicating that the MSS will change its connection to the serving BS, allocating a contention-free-based ranging resource to the MSS; and connecting a communication service with the MSS using the contention-free-based ranging resource.

In accordance with a fifth aspect of the present invention, there is provided a handover system for minimizing a service delay due to a pingpong effect in a Broad band Wireless Access (BWA) communication system. The system comprises a mobile subscriber station (MSS); a serving base station (BS); and a target BS, wherein the MSS, upon detecting a need for performing handover from the serving BS to the target BS, which is selected from neighbor BSs, changes its connection from the serving BS to the target BS, sends, to the target BS, a report indicating that the MSS will change its connection from the target BS to the serving BS, upon detecting occurrence of the pingpong effect while performing a network re-entry operation with the target BS, sends, to the target BS, a report indicating that the MSS will change its connection to the serving BS, receives a contention-free-based ranging resource allocated from the serving BS, and connects a communication service with the serving BS using the contention-free-based ranging resource; the target BS, upon receiving from the MSS a notification indicating that the MSS will change its connection from the target BS to the serving BS in a process of performing a network re-entry operation with the MSS, sends, to the serving BS, a notification indicating that the MSS will change its connection from the target BS to the serving BS; and the serving BS, upon receiving from the target BS the notification indicating that the MSS will change its connection from the target BS to the serving BS, allocates a contention-free-based ranging resource to the MSS, and connects a communication service with the MSS using the contention-free-based ranging resource.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

The present invention proposes a scheme for minimizing a service delay time upon occurrence of a pingpong effect when performing a handover operation with a target base station (BS) by a mobile subscriber station (MSS) in a Broadband Wireless Access (BWA) communication system. That is, the present invention proposes a scheme for minimizing a service delay time required for setting up a connection to a serving BS upon occurrence of a pingpong effect in which an MSS cancels a handover to a target BS and changes its connection to a serving BS when performing a network re-entry operation with the target BS in a BWA communication system. For convenience, the following description will be made on the assumption that the BWA communication system is an Institute of Electrical and Electronics Engineers (IEEE) 802.16e communication system. As described above, the IEEE 802.16e communication system refers to a BWA communication system using an Orthogonal Frequency Division Multiplexing (OFDM) scheme and/or an Orthogonal Frequency Division Multiple Access (OFDMA) scheme. The IEEE 802.16e communication system, as it uses the OFDM/OFDMA scheme, can enable high-speed data transmission by transmitting physical channel signals using a plurality of subcarriers. Further, the IEEE 802.16e communication system supports a multicell structure to support mobility of an MSS.

Figure 1:
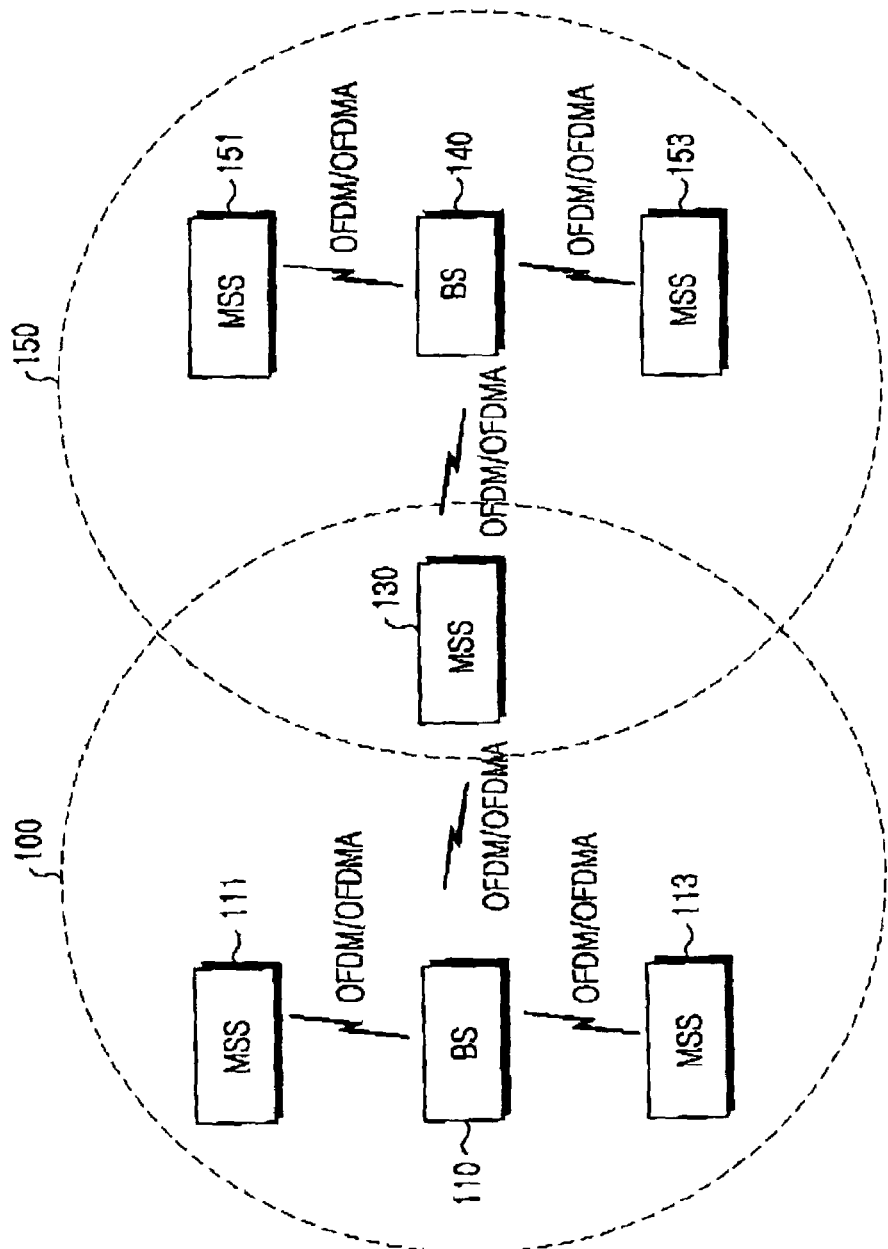
FIG. 1 is a diagram schematically illustrating a conventional IEEE 802.16e communication system.
Figure 2:
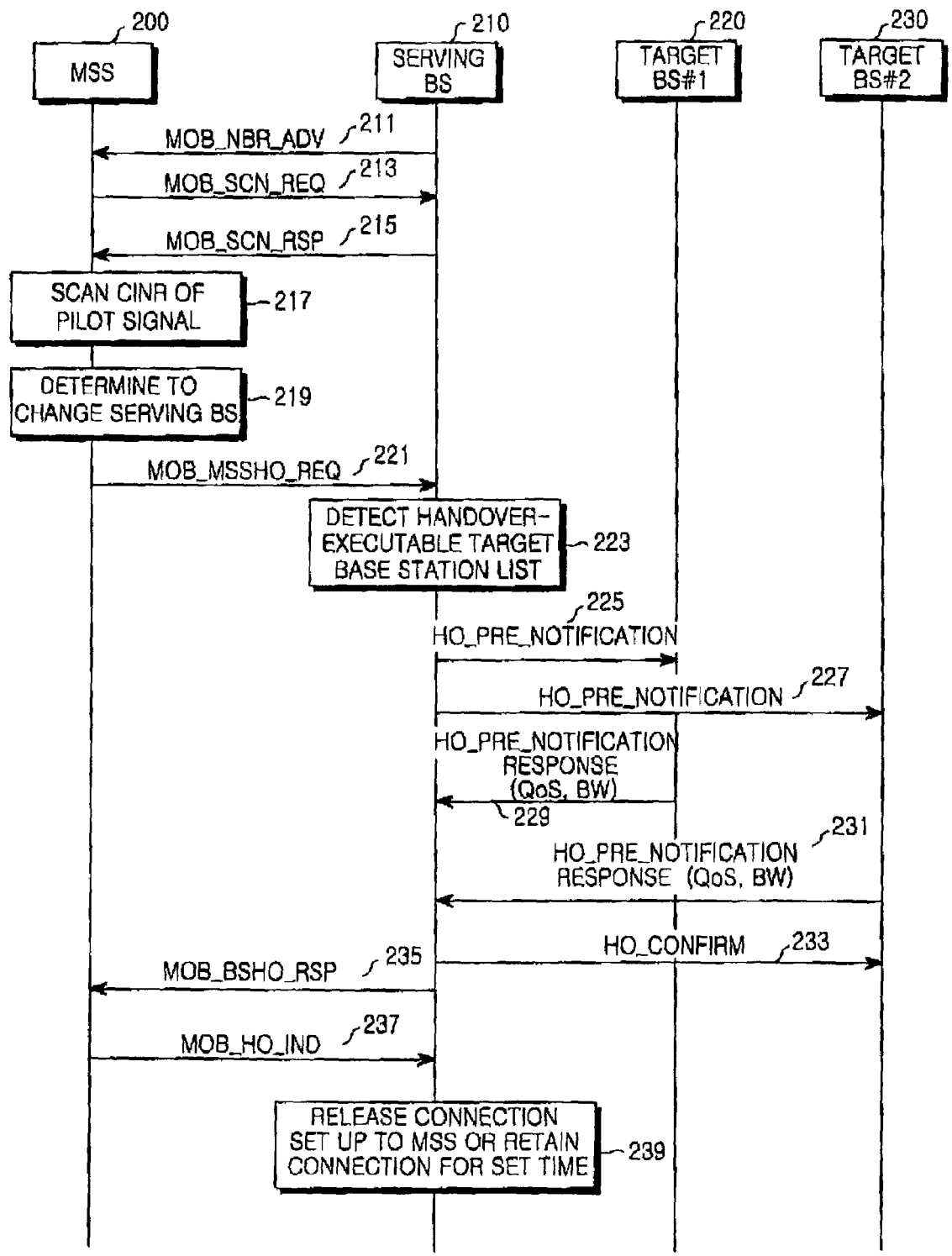
FIG. 2 is a signaling diagram illustrating a handover process initiated by an MSS in a conventional IEEE 802.16e communication system.
Figure 3:
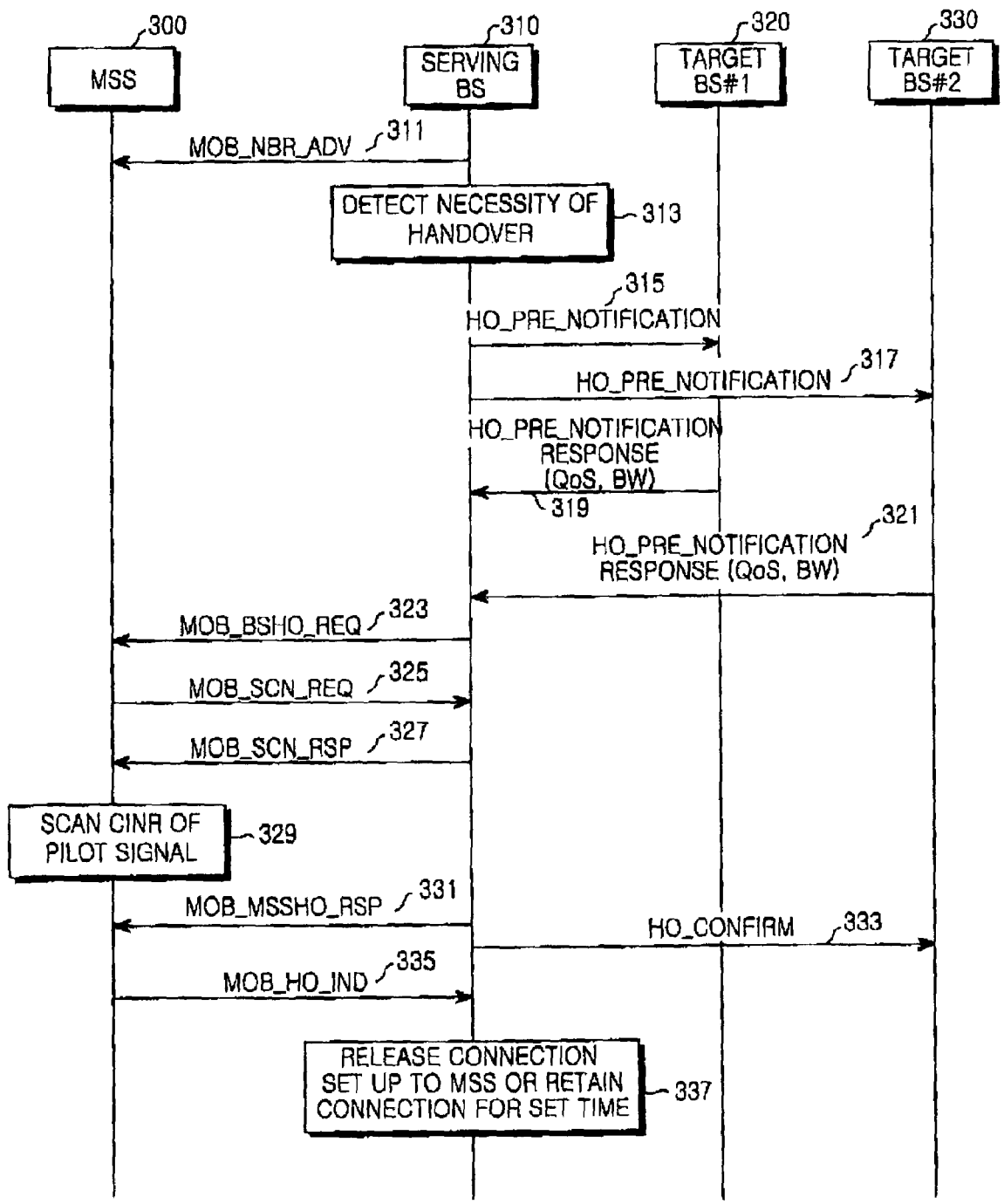
FIG. 3 is a signaling diagram illustrating a handover process initiated by a BS in a conventional IEEE 802.16e communication system.
Figure 4:
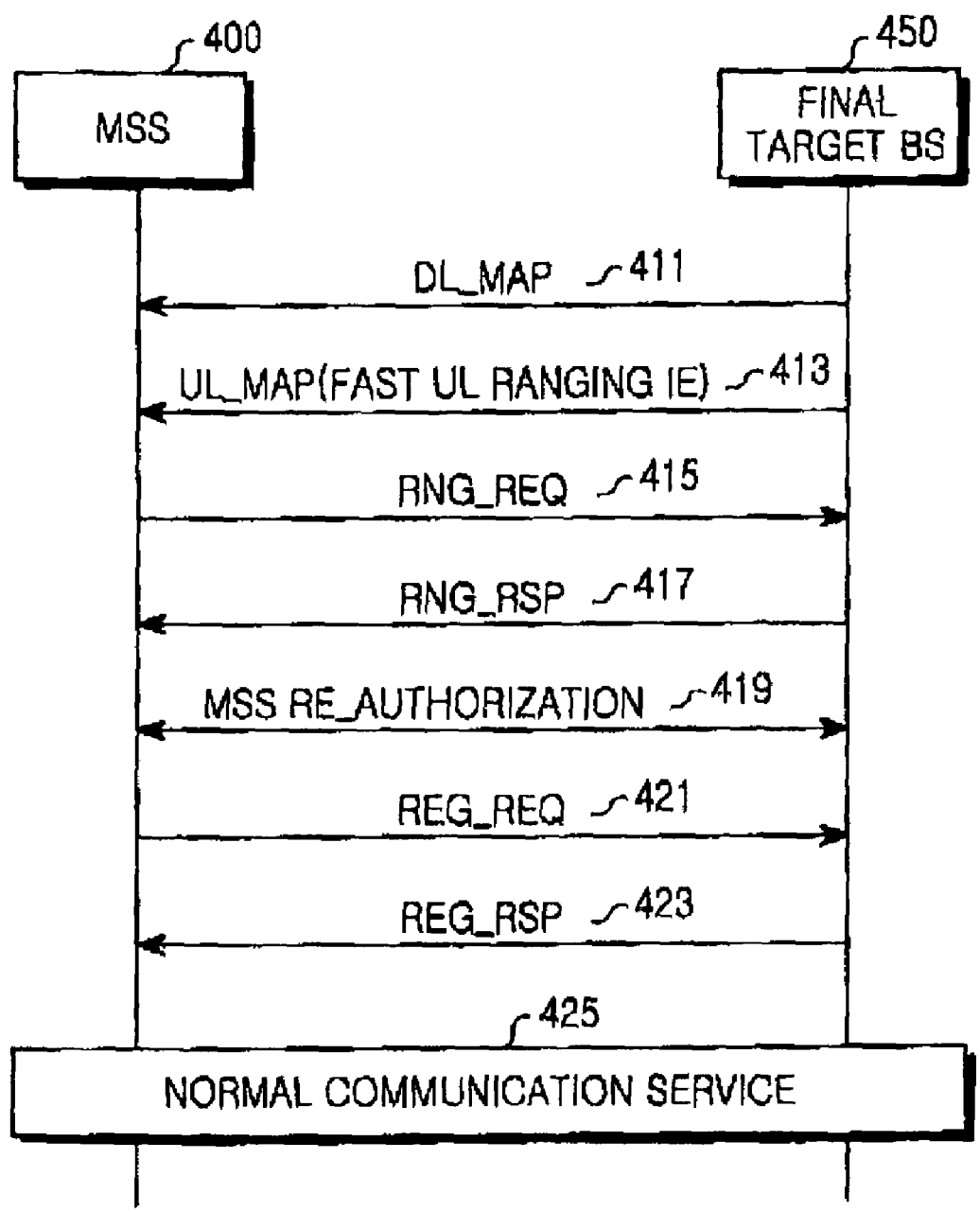
FIG. 4 is a signaling diagram illustrating a network re-entry process upon handover of an MSS in a conventional IEEE 802.16e communication system.
Figure 5:
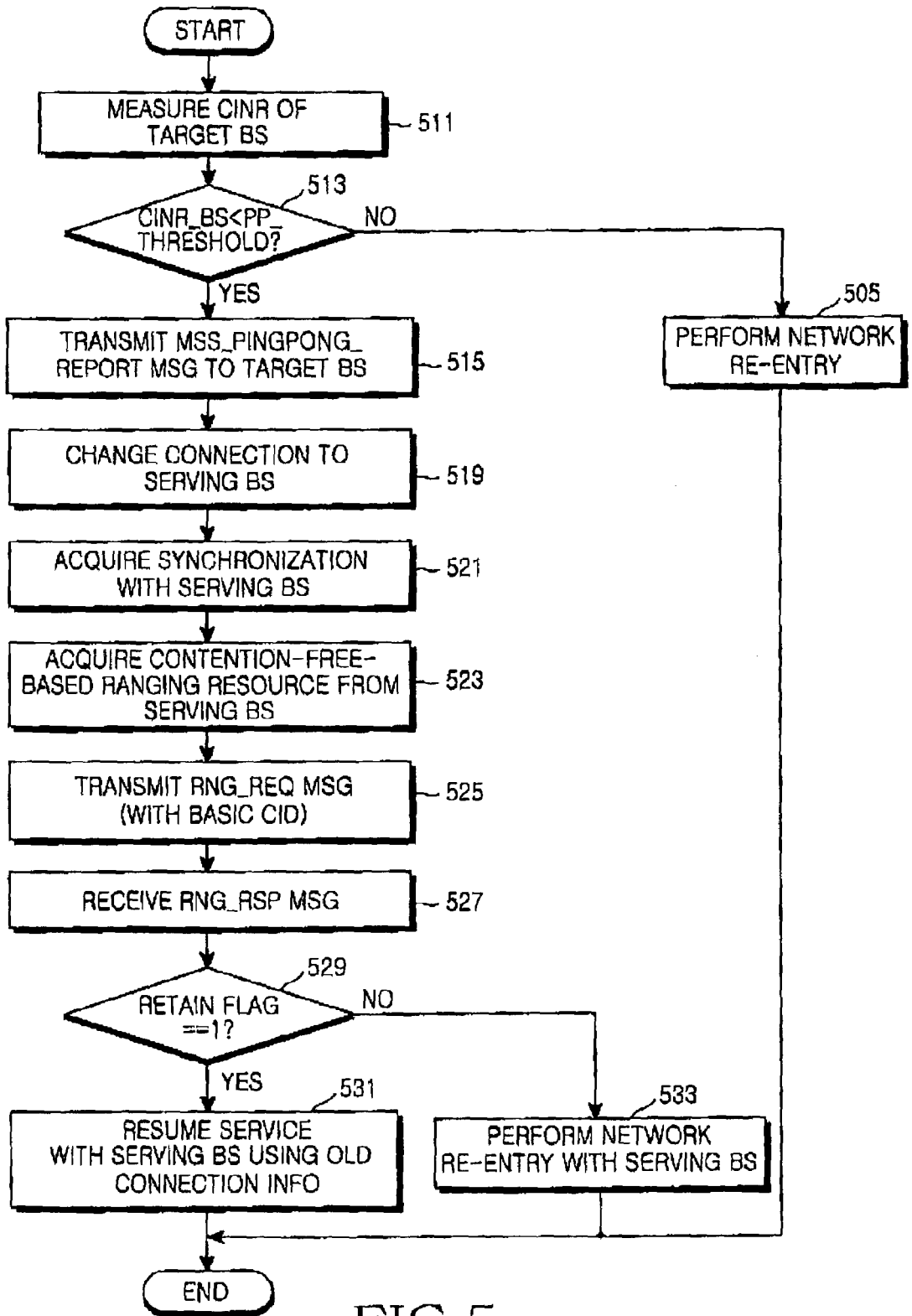
FIG. 5 is a flowchart illustrating an operation of an MSS performed upon occurrence of a pingpong effect in a network re-entry operation caused by a handover in an IEEE 802.16e communication system according to an embodiment of the present invention.

FIG. 5 is a flowchart illustrating an operation of an MSS performed upon occurrence of a pingpong effect in a network re-entry operation caused by a handover in an IEEE 802.16e communication system according to an embodiment of the present invention. Referring to FIG. 5, in step 511, the MSS measures a carrier-to-interference and noise ratio (CINR) of a pilot signal received from a target BS in a process of performing a network re-entry operation with the target BS. Herein, the "network re-entry operation" refers to an operation in which as an MSS changes its connection from an old serving BS to a target BS, the MSS acquires synchronization with the target BS, and then performs initial ranging, authentication, and registration operations with the target BS, as described in the Related Art section. That is, the network re-entry operation represents a series of operations in which the MSS changes its connection from the serving BS to the target BS, and finally receives a Registration Response (REG_RSP) message from the target BS. Therefore, in step 511, the process of performing a network re-entry operation with the target BS by the MSS refers to a process of performing, by the MSS, any one of the operations from an operation of performing initial ranging to an operation of receiving the REG_RSP message from the target BS.

In step 513, the MSS determines if the measured CINR of the target BS (CINR_BS) is lower than a predetermined pingpong threshold (PP_THRESHOLD). Herein, the PP_THRESHOLD is set higher than a handover threshold (HO_THRESHOLD) based on which it is determined that the MSS should be handed over from its old serving BS to another BS being different from the old serving BS. The HO_THRESHOLD is set to prevent unnecessary handover due to the pingpong effect, thus enabling the MSS to perform handover to a target BS with reliability.

If it is determined that the CINR_BS is higher than or equal to the PP_THRESHOLD, in step 505, the MSS performs a network re-entry operation with the target BS, and then ends its operation. However, if it is determined that the CIR_BS is lower than the PP_THRESHOLD, in step 515, the MSS determines that the pingpong effect has occurred because the CINR_BS is lower than the PP_THRESHOLD, and transmits to the target BS an MSS pingpong report (MSS_PING-PONG_REPORT) message indicating that the MSS will change its connection from the target BS back to the serving BS due to occurrence of the pingpong effect. A format of the MSS_PINGPONG_REPORT message is illustrated in Table 16.

TABLE 16

| Syntax | Size | Notes |
|---|---|---|
| MSS_PINGPONG_Report_Message _Format( ) { | | |
| Management Message Type = TBD | 8 bits | |
| Serving BS-ID | 48 bits | The unique identifier of the former Serving BS |
| Estimated PP time | 8 bits | Estimated number of frames starting from the frame until the MSS may return to the Serving BS. A value of zero in this parameter signifies that this parameter should be ignored. |
| } | | |

In Table 16, the MSS_PINGPONG_REPORT message includes a plurality of information elements (IEs), i.e., Management Message Type indicating a type of a transmission message, Serving BS-ID indicating an ID of a serving BS to which the MSS will change its connection, and Estimated PP time indicating an estimated time at which the MSS will change its connection to the serving BS.

In step 519, the MSS changes its connection from the target BS to the serving BS. In step 521, the MSS acquires synchronization with the serving BS by receiving a downlink_MAP (DL_MAP) message from the serving BS. In step 523, the MSS acquires a contention-free-based ranging resource by receiving an uplink_MAP (UL_MAP) message from the serving BS. An operation of allocating, by the serving BS, a contention-free-based ranging resource to the MSS, which changes its connection back to the serving BS, due to occurrence of the pingpong effect will be described in detail later.

In step 525, the MSS transmits a Ranging Request (RNG_REQ) message to the serving BS using the contention-free-based ranging resource allocated by the target BS. The RNG_REQ message includes a basic connection identifier (CID) of the MSS, and the basic CID is a basic CID that the MSS was allocated from the serving BS before the MSS changes its connection from the target BS to the serving BS.

operation with an MSS that has changed its connection refers to an operation of performing by the target BS any one of the operations from an operation of performing initial ranging to an operation of transmitting the REG_RSP message to the MSS, as described with reference to FIG. 5.

If it is determined that the MSS_PINGPONG_REPORT message has been received from the serving BS, the target BS proceeds to step 613. Of course, if it is determined that the MSS_PINGPONG_REPORT message has not been received from the serving BS, the target BS continuously performs the network re-entry operation with the MSS. In step 613, the target BS recognizes that the MSS, which is performing the network re-entry operation with the target BS, will change its connection to the serving BS.

In step 615, the target BS transmits an MSS pingpong notification (MSS_PINGPONG_NOTIFICATION) message indicating a connection change of the MSS to the serving BS, recognizing that the handover of the MSS is caused by the pingpong effect. A format of the MSS_PINGPONG_NOTIFICATION message is illustrated in Table 17.

TABLE 17

| Syntax | Size | Notes |
| --- | --- | --- |
| MSS_PINGPONG_Notification_Message_Format( ) { | | |
| Global Header | 152 bits | |
| MSS unique identifier | 48 bits | 48-bit unique identifier of the MSS |
| Estimated PP time | 8 bits | Same value in MSS_PINGPONG_Report message |
| Security field | TBD | A means to authenticate this message |
| CRC field | 32 bits | IEEE CRC-32 |
| } | | |

In step 527, the MSS receives a Ranging Response (RNG_RSP) message from the serving BS in response to the RNG_REQ message.

In step 529, the MSS determines if a value of Retain Flag included in the received RNG_RSP message is set to 1. Here, the Retain Flag indicates if the serving BS retains information on a connection to the MSS, and is newly added to the RNG_RSP message. If the Retain Flag is set to 0 (Retain Flag=0), it indicates that the serving BS does not retain the connection information for the MSS, and if the Retain Flag is set to 1 (Retain Flag=1), it indicates that the serving BS retains the connection information for the MSS. A detailed description of the Retain Flag will be made later.

If it is determined in step 529 that a value of the Retain Flag is set to 1, the MSS proceeds to step 531. In step 531, the MSS resumes a communication service with the serving BS using connection information before its connection change to the target BS, i.e., information on the connection to the serving BS, and then ends its operation. However, if it is determined in step 529 that a value of the Retain Flag is not set to '1', i.e., a value of the Retain Flag is set to '0', the MSS proceeds to step 533, where the MSS performs a network re-entry operation with the serving BS, and then ends its operation.

Figure 6:
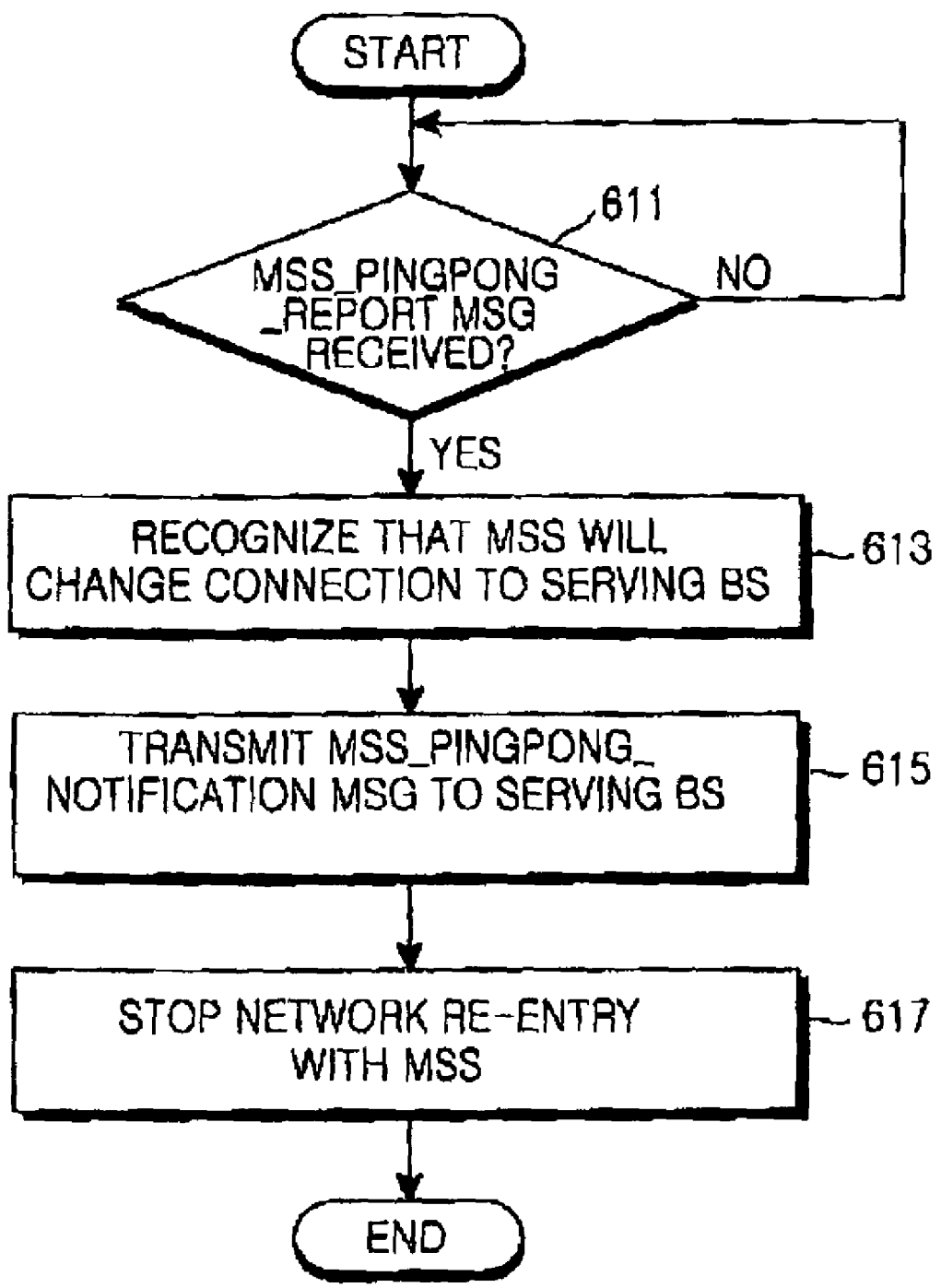
FIG. 6 is a flowchart illustrating an operation of a target BS performed upon occurrence of a pingpong effect in a network re-entry operation caused by a handover in an IEEE 802.16e communication system according to an embodiment of the present invention.

FIG. 6 is a flowchart illustrating an operation of a target BS performed upon an occurrence of a pingpong effect in a network re-entry operation caused by a handover in an IEEE 802.16e communication system according to an embodiment of the present invention. Referring to FIG. 6, in step 611, the target BS determines if an MSS_PINGPONG_REPORT message is received from a serving BS, in a process of performing a network re-entry operation with an MSS that has changed its connection from an old serving BS to the target BS. Herein, the target BS performing a network re-entry As illustrated in Table 17, the MSS_PINGPONG_NOTIFICATION message includes a plurality of IEs, i.e., a Global Header commonly included in messages exchanged between BSs in a backbone network, an MSS unique identifier indicating an ID of an MSS that desires to change its connection to a serving BS, and an Estimated PP time indicating a time at which the MSS will perform connection change to the serving BS. The Estimated PP time is equal to the Estimated PP time included in the MSS_PINGPONG_REPORT message shown in Table 16, transmitted to the target BS by the MSS.

In step 617, the target BS stops the network re-entry operation, which was being performed with the MSS, and then ends its operation.

Figure 7:
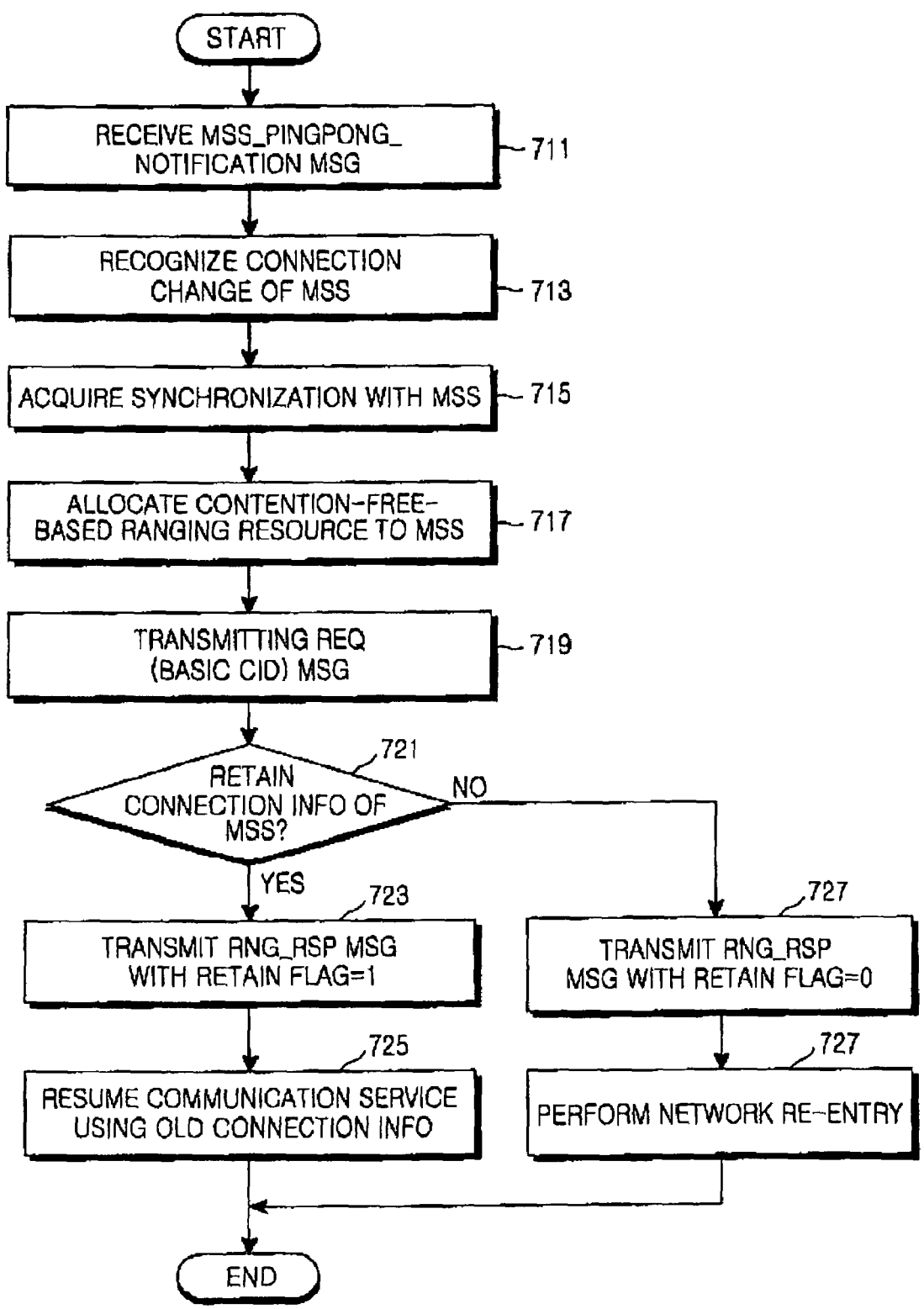
FIG. 7 is a flowchart illustrating an operation of a serving BS performed upon occurrence of a pingpong effect in a network re-entry operation caused by a handover in an IEEE 802.16e communication system according to an embodiment of the present invention.

FIG. 7 is a flowchart illustrating an operation of a serving BS performed upon an occurrence of a pingpong effect in a network re-entry operation caused by a handover in an IEEE 802.16e communication system according to an embodiment of the present invention. Referring to FIG. 7, in step 711, the serving BS receives an MSS_PINGPONG_NOTIFICATION message from the target BS. In step 713, the serving BS, as it receives the MSS_PINGPONG_NOTIFICATION message, recognizes that the MSS that has changed its connection to the target BS will change its connection back to the serving BS due to occurrence of the pingpong effect, and then proceeds to step 715. The serving BS can recognize an estimated time at which the MSS that has changed its connection to the target BS will change its connection back to the serving BS, based on a value of Estimated PP time included in the MSS_PINGPONG_NOTIFICATION message.

In step 715, the serving BS acquires synchronization with the connection-changed MSS. In step 717, the serving BS allocates a contention-free-based ranging resource to the MSS that has changed its connection to the serving BS due to the pingpong effect, in order to enable the MSS to perform contention-free-based initial ranging. Herein, the "contention-free-based ranging resource" refers to information included in Fast_UL_ranging_IE() described with reference to Table 13.

In step 719, the serving BS receives from the MSS an RNG_REQ message corresponding to the resource allocated to the MSS. Here, the RNG_REQ message includes a basic CID of the MSS, and the basic CID refers to a basic CID that the MSS was allocated from the serving BS before its connection change from the serving BS to the target BS. Upon receiving an RNG_REQ message including the basic CID, the serving BS recognizes that the MSS has changed its connection to the serving BS due to occurrence of the pingpong effect.

In step 721, the serving BS determines if it is retaining connection information for the MSS. When the serving BS receives from the MSS a Mobile Handover Indication (MOB_HO_IND) message indicating that the MSS will perform handover to a target BS, the serving BS can either immediately delete connection information for the MSS or retain the connection information for the MSS for a predetermined time.

If it is determined in step 721 that the serving BS is retaining connection information for the MSS, in step 723, the serving BS transmits an RNG_RSP message with Retain Flag=1 to the MSS in response to the RNG_REQ message, and then proceeds to step 725. Here, the Retain Flag is a flag indicating if the serving BS retains information on a connection to the MSS, and is newly added to the RNG_RSP message.

In step 725, the serving BS resumes a communication service with the MSS using connection information allocated before the MSS changes its connection to the target BS, and then ends its operation. That is, because the serving BS previously has connection information for the MSS, the serving BS can immediately resume the communication service without performing a separate network re-entry operation, i.e., initial ranging, authentication, and registration operations, with the MSS.

However, if it is determined in step 721 that the serving BS is not retaining connection information for the MSS, in step 727, because the serving BS deleted the connection information for the MSS, the serving BS transmits an RNG_RSP message with Retain Flag=0 to the MSS, and then proceeds to step 729. In step 729, because the serving BS deleted the connection information for the MSS, the serving BS performs a common network re-entry operation, i.e., initial ranging, authentication, and registration operations, with the MSS, and then ends its operation.

An encoding format of the RNG_REQ message for Basic CID, included in the RNG_REQ message, is illustrated in Table 18.

TABLE 18

| Name | Type | Length | Values (Variable-length) |
| --- | --- | --- | --- |
| Basic CID | TBD (6) | 2 | The Basic CID assigned from the former Serving BS |

As shown in Table 18, the encoding format of the RNG_REQ message for Basic CID includes Type indicating that a type of TLV (Type, Length, Value) set in the RNG_REQ message is Basic CID, Length indicating a length of the Basic CID, and Values indicating a meaning of a value set in the Basic CID. The Basic CID represents Basic CID information that the MSS has used during its communication with a serving BS.

An encoding format of the RNG_RSP message for Retain Flag, included in the RNG_RSP message, is illustrated in Table 19.

TABLE 19

| Name | Type | Length | Values (Variable-length) |
| --- | --- | --- | --- |
| Retain Flag | TBD(20) | 1 | This value indicates whether the Serving BS retains the connection information for the MSS. 0 = the connection information for the MSS deleted 1 = the connection information for the MSS retained |

As illustrated in Table 19, the encoding format of the RNG_RSP message for Retain Flag includes Type indicating that a type of TLV set in the RNG_RSP message is Retain Flag, Length indicating a length of the Retain Flag, and Values indicating a meaning of a value set in the Retain Flag. The Retain Flag is a TLV value of the RNG_RSP message, for indicating if the serving BS retains the connection information for the MSS, and a value of the Retain Flag can be set to 0 or 1. If a value of the Retain Flag is set to '0', it indicates that the serving BS is not retaining the connection information for the MSS, and if the Retain Flag is set to '1', it indicates that the serving BS is retaining the connection information for the MSS.

As described above, in a BWA communication system using an OFDM/OFDMA scheme, particularly, in an IEEE 802.16e communication system, when an MSS that has performed handover from a serving BS to a final target BS suffers a pingpong effect between the serving BS and the final target BS and thus attempts a connection change to the serving BS, the final target BS previously informs the serving BS of the connection change of the MSS due to the pingpong effect, thereby minimizing overhead required in performing a network re-entry procedure between the MSS and the serving BS, and the MSS rapidly resumes a communication service through the serving BS, thereby improving the communication service quality of the MSS.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A handover method for minimizing a service delay due to a pingpong effect in a Broadband Wireless Access (BWA) communication system having a mobile subscriber station (MSS), a serving base station (BS) in communication with the MSS, and a plurality of neighbor BSs being different from the serving BS, the method comprising the steps of:

upon detecting a need for performing handover from the serving BS to a target BS selected from the neighbor BSs, changing, by the MSS, its connection from the serving BS to the target BS;

after changing its connection from the serving BS to the target BS, detecting, by the MSS, occurrence of the pingpong effect while performing a network re-entry operation with the target BS;

sending, by the MSS, to the target BS, a report indicating that the MSS will change its connection from the target BS to the serving BS due to the occurrence of the pingpong effect sending, by the target BS, to the serving BS, a notification indicating that the MSS will change its connection from the target BS to the serving BS, based on the report from the MSS;

allocating, by the serving BS, a contention-free-based ranging resource to the MSS based on the notification from the target BS; and connecting, by the MSS, to a communication service with the serving BS using the contention-free-based ranging resource.

2. The handover method of claim 1, wherein the step of connecting, by the MSS, to the communication service with the serving BS comprises the steps of:

performing an initial ranging with the serving BS using the contention-free-based ranging resource;

if the initial ranging result indicates that the serving BS retains old connection information used before the MSS has changed its connection from the serving BS to the target BS, connecting a communication service with the serving BS using the old connection information; and if the initial ranging result indicates that the serving BS does not retain the old connection information, performing authentication and registration operations with the serving BS, before connecting the communication service.

3. The handover method of claim 1, further comprising the step of stopping, by the target BS, the network re-entry operation with the MSS, after sending, to the serving BS, the notification indicating that the MSS will change its connection from the target BS to the serving BS.

4. The handover method of claim 1, wherein the step of detecting, by the MSS, the need for performing the handover from the serving BS to the target BS comprises the step of:

detecting the necessity of performing the handover from the serving BS to the target BS, if a carrier-to-interference and noise ratio (CINR) of a reference signal transmitted form the serving BS is lower than a predetermined first threshold.

5. The handover method of claim 4, wherein the step of detecting, by the MSS, the occurrence of the pingpong effect comprises the step of:

detecting the occurrence of the pingpong effect if a CINR of a reference signal transmitted from the target BS is lower than a predetermined second threshold.

6. The handover method of claim 5, wherein the second threshold is higher than the first threshold.

7. A handover method of a mobile subscriber station (MSS) for minimizing a service delay due to a pingpong effect in a Broadband Wireless Access (BWA) communication system having the MSS, a serving base station (BS) in communication with the MSS, and a plurality of neighbor BSs being different from the serving BS, the method comprising the steps of:

upon detecting a need for performing handover from the serving BS to a target BS selected from the neighbor BSs, changing its connection from the serving BS to the target BS;

after changing its connection from the serving BS to the target BS, detecting an occurrence of the pingpong effect when performing a network re-entry operation with the target BS;

sending, to the target BS, a report indicating that the MSS will change its connection from the target BS to the serving BS due to the occurrence of the pingpong effect;

after sending, to the target BS, the report indicating that the MSS will change its connection to the serving BS, changing its connection from the target BS to the serving BS; and after changing its connection to the serving BS, connecting a communication service with the serving BS using a contention-free-based ranging resource allocated from the serving BS.

8. The handover method of claim 7, wherein the step of connecting a communication service with the serving BS comprises the steps of:

performing an initial ranging with the serving BS using the contention-free-based ranging resource;

if the initial ranging result indicates that the serving BS retains old connection information used before the MSS has changed its connection from the serving BS to the target BS, connecting a communication service with the serving BS using the old connection information; and if the initial ranging result indicates that the serving BS does not retain the old connection information, performing authentication and registration operations with the serving BS, before connecting the communication service.

9. The handover method of claim 7, wherein the step of detecting the need for performing the handover from the serving BS to the target BS comprises the step of: detecting the need for performing the handover from the serving BS to the target BS if a carrier-to-interference and noise ratio (CINR) of a reference signal transmitted form the serving BS is lower than a predetermined first threshold.

10. The handover method of claim 9, wherein the step of detecting the occurrence of the pingpong effect comprises the step of:

detecting the occurrence of the pingpong effect if a CINR of a reference signal transmitted from the target BS is lower than a predetermined second threshold.

11. The handover method of claim 10, wherein the second threshold is higher than the first threshold.

12. A handover method of a target base station (BS) for minimizing a service delay due to a pingpong effect in a Broadband Wireless Access (BWA) communication system having a mobile subscriber station (MSS), a serving BS in communication with the MSS, and a plurality of neighbor BSs being different from the serving BS, the method comprising the steps of:

upon detecting the MSS's need for performing a handover from the serving BS to the target BS, receiving from the MSS a report indicating that the MSS will change its connection from the target BS to the serving BS due to occurrence of the pingpong effect while performing a network re-entry operation with the MSS that has changed its connection from the serving BS to the target BS; and sending, to the serving BS, a notification indicating that the MSS will change its connection from the target BS to the serving BS, based on the report from the MSS.

13. The handover method of claim 12, further comprising the step of stopping the network re-entry operation with the MSS after sending, to the serving BS, the notification indicating that the MSS will change its connection from the target BS to the serving BS.

14. A handover method of a serving base station (BS) for minimizing a serving delay due to a pingpong effect in a Broad band Wireless Access (BWA) communication system having a mobile subscriber station (MSS), the serving BS in communication with the MSS, and a plurality of neighbor BSs being different from the serving BS, the method comprising the steps of:

upon receiving from the MSS a notification indicating that the MSS will perform handover from the serving BS to a target BS selected from the neighbor BS, deleting connection information for the MSS;

receiving from the target BS a notification indicating that the MSS will change its connection to the serving BS due to occurrence of the pingpong effect;

upon receiving from the MSS a notification indicating that the MSS will change its connection to the serving BS, allocating a contention-free-based ranging resource to the MSS; and connecting a communication service with the MSS using the contention-free-based ranging resource.

15. The handover method of claim 14, wherein the step of connecting a communication service with the MSS comprises the steps of:

performing initial ranging with the MSS using the contention-free-based ranging resource;

if the initial ranging result indicates that the serving BS retains old connection information used before the MSS has changed its connection from the serving BS to the target BS, connecting a communication service with the MSS using the old connection information; and if the initial ranging result indicates that the serving BS does not retain the connection information, performing authentication and registration operations with the MSS, before connecting the communication service.

16. A handover system for minimizing a service delay due to a pingpong effect in a Broad band Wireless Access (BWA) communication system, the system comprising:

a mobile subscriber station (MSS);
a serving base station (BS); and
a target BS, wherein the MSS, upon detecting a need for performing handover from the serving BS to the target BS, which is selected from neighbor BSs, changes its connection from the serving BS to the target BS, sends, to the target BS, a report indicating that the MSS will change its connection from the target BS to the serving BS, upon detecting occurrence of the pingpong effect while performing a network re-entry operation with the target BS, sends, to the target BS, a report indicating that the MSS will change its connection to the serving BS, receives a contention-free-based ranging resource allocated from the serving BS, and connects a communication service with the serving BS using the contention-free-based ranging resource;

the target BS, upon receiving from the MSS a notification indicating that the MSS will change its connection from the target BS to the serving BS in a process of performing a network re-entry operation with the MSS, sends, to the serving BS, a notification indicating that the MSS will change its connection from the target BS to the serving BS; and the serving BS, upon receiving from the target BS the notification indicating that the MSS will change its connection from the target BS to the serving BS, allocates a contention-free-based ranging resource to the MSS, and connects a communication service with the MSS using the contention-free-based ranging resource.

17. The handover system of claim 16, wherein the MSS performs initial ranging with the serving BS using the contention-free-based ranging resource, and if the initial ranging result indicates that the serving BS retains old connection information used before the MSS has changed its connection from the serving BS to the target BS, connects a communication service with the serving BS using the old connection information.

18. The handover system of claim 17, wherein the MSS performs initial ranging with the serving BS using the contention-free-based ranging resource, and if the initial ranging result indicates that the serving BS does not retain the old connection information, performs authentication and registration operations with the serving BS before connecting the communication service.

19. The handover system of claim 16, wherein the target BS stops the network re-entry operation with the MSS, after sending, to the serving BS, the notification indicating that the MSS will change its connection from the target BS to the serving BS.

20. The handover system of claim 16, wherein the MSS detects the need for performing the handover from the serving BS to the target BS, if a carrier-to-interference and noise ratio (CINR) of a reference signal transmitted from the serving BS is lower than a predetermined first threshold.

21. The handover system of claim 20, wherein the MSS detects the occurrence of the pingpong effect, if a CINR of a reference signal transmitted from the target BS is lower than a predetermined second threshold.

22. The handover system of claim 21, wherein the second threshold is higher than the first threshold.

23. A handover method of a serving base station (BS) for minimizing a serving delay due to a pingpong effect in a Broad band Wireless Access (BWA) communication system having a mobile subscriber station (MSS), the serving BS in communication with the MSS, and a plurality of neighbor BSs being different from the serving BS, the method comprising the steps of:

upon receiving from the MSS a notification indicating that the MSS will perform handover from the serving BS to a target BS selected from the neighbor BS, retaining the connection information for a predetermined time;

receiving from the target BS a notification indicating that the MSS will change its connection to the serving BS due to occurrence of the pingpong effect;

upon receiving from the MSS a notification indicating that the MSS will change its connection to the serving BS, allocating a contention-free-based ranging resource to the MSS; and connecting a communication service with the MSS using the contention-free-based ranging resource.

24. The handover method of claim 23, wherein the step of connecting a communication service with the MSS comprises the steps of:

performing initial ranging with the MSS using the contention-free-based ranging resource;

if the initial ranging result indicates that the serving BS retains old connection information used before the MSS has changed its connection from the serving BS to the target BS, connecting a communication service with the MSS using the old connection information; and if the initial ranging result indicates that the serving BS does not retain the connection information, performing authentication and registration operations with the MSS, before connecting the communication service.

* * * * *